United States Patent [19]

Shimazaki et al.

[11] Patent Number: 4,746,930

[45] Date of Patent: May 24, 1988

[54] THERMAL PRINTING HEAD

[75] Inventors: Takashi Shimazaki, Yokohama; Kunihiko Miura, Hiratsuka, both of Japan

[73] Assignee: Kabushiki Kaisha Toshiba, Kawasaki, Japan

[21] Appl. No.: 883,720

[22] Filed: Jul. 9, 1986

[30] Foreign Application Priority Data

Jul. 16, 1985 [JP] Japan ................................ 60-156502
Jul. 31, 1985 [JP] Japan ................................ 60-167743

[51] Int. Cl.⁴ ................................................ G01D 15/10

[52] U.S. Cl. ............................ 346/76 PH; 346/140 R; 400/120; 219/216

[58] Field of Search ............ 346/76 PH, 76 L, 140 R; 219/216 PH; 400/120

[56] References Cited

U.S. PATENT DOCUMENTS

| | | | |
|---|---|---|---|
| 4,298,786 | 11/1981 | Marciniec | 346/76 PH |
| 4,401,881 | 8/1983 | Saito | 346/76 PH X |
| 4,506,272 | 3/1985 | Arai | 346/76 PH |
| 4,561,789 | 12/1985 | Saito | 346/76 PH X |

*Primary Examiner*—E. A. Goldberg
*Assistant Examiner*—Linda M. Peco
*Attorney, Agent, or Firm*—Finnegan, Henderson, Farabow, Garrett & Dunner

[57] ABSTRACT

In a thermal head used in a printer, a rod-shaped mounting member carries heating elements thereon. The mounting member is formed of a metal material, and the heating elements are arranged over the peripheral surface of the mounting member with an insulating material interposed. Excess heat accumulated in the heating elements is quickly transmitted to the mounting member and diffused.

20 Claims, 17 Drawing Sheets

THERMAL PRINTING HEAD

BACKGROUND OF THE INVENTION

The present invention relates to a thermal head which is used in printers, facsimiles, and other image-forming apparatuses, and which produces heat in response to an image-forming signal.

Thermal heads of this type generally comprise a plurality of heat-generating resistors, as heating elements, mounted on a glazed ceramic substrate. The heat-generating resistors are connected to a circuit board by means of wires, as electrical conductors. The circuit board causes a current flow through the resistors to generate heat in accordance with image information to be recorded. As a result, the information is recorded on a sheet. In doing this, for example, thermosensitive paper may be used for the sheet, or ink from an ink ribbon may be transferred to the sheet by fusion.

Meanwhile, a ceramic plate with a polished level surface is used for the substrate of the thermal head for the heating elements. In this case, the heating elements must be arranged on one and the same level surface, which is polished with considerably high accuracy.

Thus, according to the prior art thermal heads described above, high-accuracy polishing work for the ceramic substrate requires much labor, resulting in higher cost.

In use, moreover, an ink-ribbon film or other medium is interposed between the thermal head and recording paper. This usually requires some space around the head. It is therefore difficult to provide small-sized printers. Thus, there is an increasing demand for thermal heads which permit reduction in size of printers.

SUMMARY OF THE INVENTION

The object of the present invention is to provide a thermal head which is low in cost and conducive to the miniaturization of printers.

According to an aspect of the present invention, there is provided a thermal head which is used in a printer and produces heat in response to an image-forming signal, comprising:

a heating element adapted to produce heat when supplied with electric power;

a mounting member carrying thereon the heating element and a lead-out electrode for supplying electric power to the heating element, said mounting member being formed from a metal material into a rod-shaped structure, so that the heating element and the lead-out electrode are mounted on the peripheral surface of the rod-shaped structure with the interposition of an insulating material;

a support member for supporting the mounting member; and a drive unit connected to the lead-out electrode to drive the heating element.

DETAILED DESCRIPTION OF THE PREFERRED EMBODIMENTS

An embodiment of the present invention will now be described in detail with reference to FIGS. 1 to 25.

Figure 1:
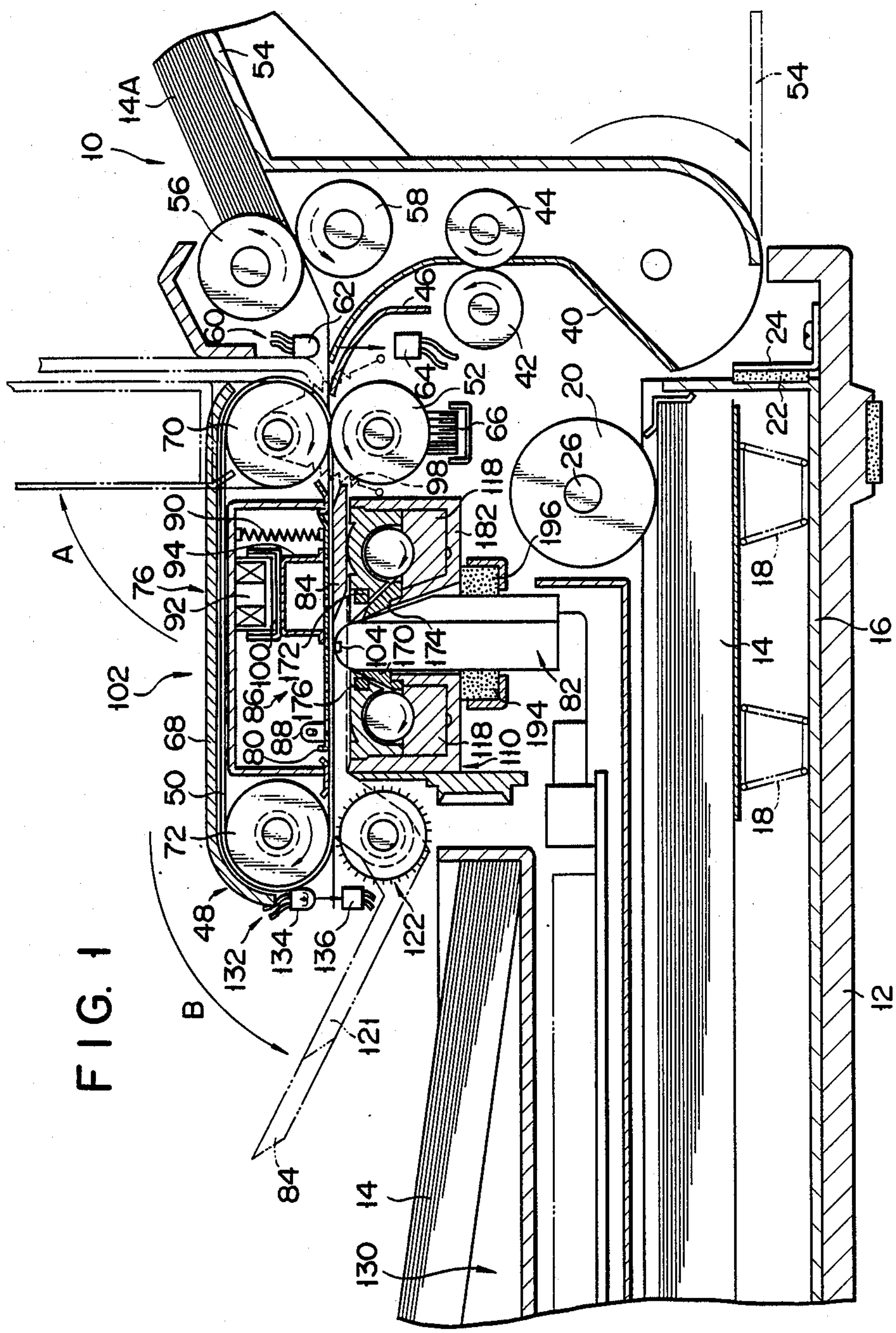
FIG. 1 is a schematic longitudinal sectional view of a printer according to an embodiment of the present invention.
Figure 2:
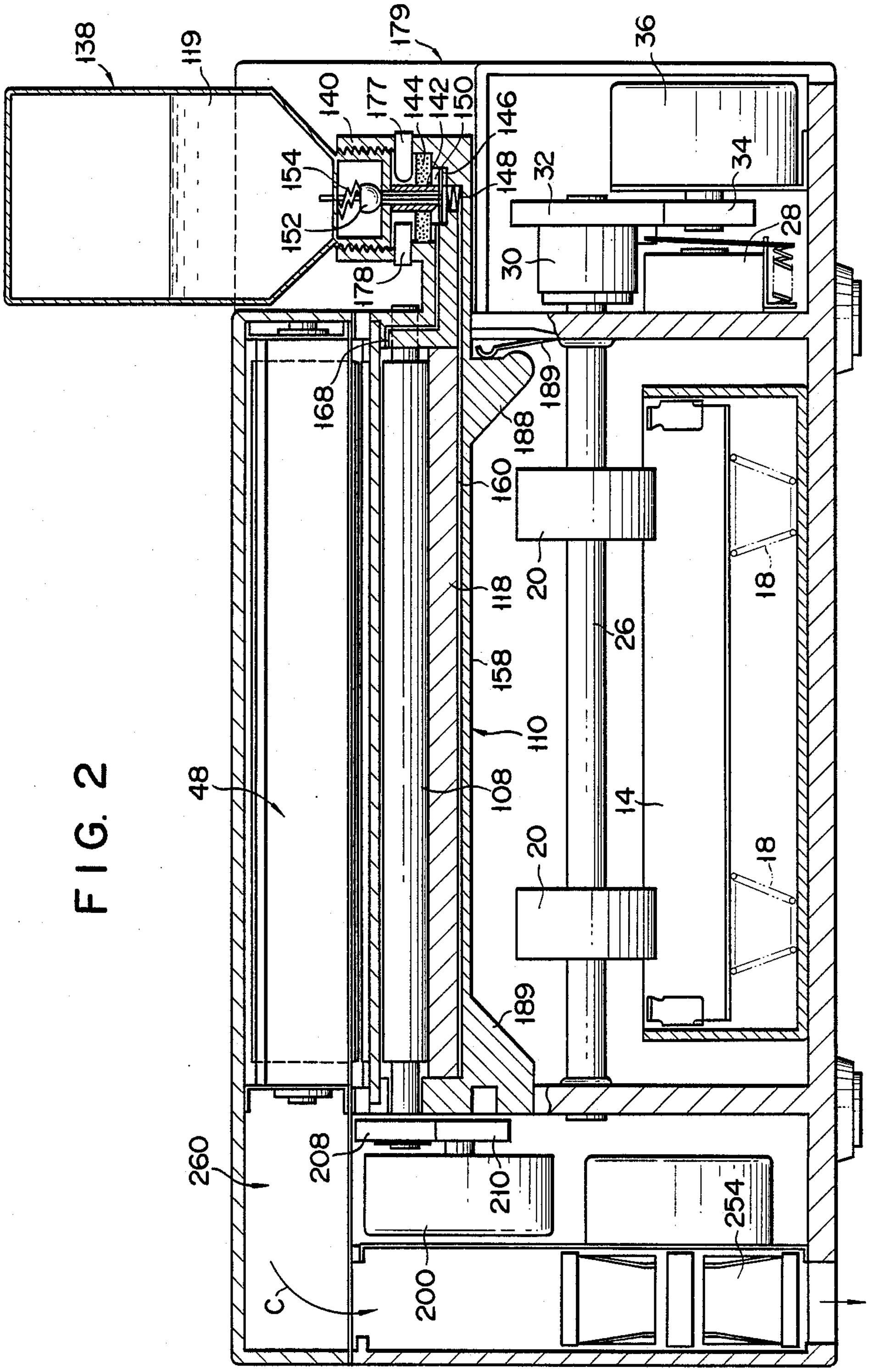
FIG. 2 is a schematic cross-sectional view of the printer shown in FIG. 1.

As shown in FIGS. 1 and 2, in printer 10 provided on the thermal head of a first embodiment, paper feed cassette 16, for storing recording sheets 14 to be printed, is loaded in the lower portion of housing 12. A lower plate of cassette 16 at the paper pick-up side is pushed upward by the biasing force of push-up springs 18, and uppermost recording sheet 14 is always in contact with first feed rollers 20. When cassette 16 is loaded in housing 12, rubber magnet 22, mounted on cassette 16, magnetically attracts metal plate 24, mounted on housing 12, to be fixed to housing 12.

Shaft 26 axially supports first feed rollers 20 and is coupled to paper feed motor 36 through spring clutch 30 and gears 32 and 34, as shown in FIG. 2. Spring clutch 30 is engaged/disengaged by solenoid 28. When solenoid 28 is energized in response to a recording signal from image- or data-processing apparatus 38 (not shown) connected to printer 10, clutch 30 engages shaft 26 with gear 32. Therefore, rotating power from motor 36 is transmitted to shaft 26, through gears 32 and 34 and clutch 30, and uppermost recording sheet 14, contacting rollers 20, is conveyed.

Recording sheet 14, picked up from cassette 16 through rollers 20, is guided upward along first paper feed guide 40, and is then clamped and conveyed by a pair of feed rollers 42 and 44. Rollers 42 and 44 are arranged in a paper feed direction and are in rolling contact with each other. Thus, sheet 14 is fed between first and second paper feed guides 40 and 46. Sheet 14 is fed until its front edge abuts against attraction conveyor belt 50 of paper conveyor unit 48 (to be described later) and register roller 52, which is in rolling contact therewith and is stopped, thus standing by at this position.

Printer 10 is provided with manual paper feed table 54, for manually feeding sheets, and cassette 16. When manual recording sheets 14A (e.g., thick sheets) are fed manually on table 54, they are picked up one by one from the lowermost sheet by means of second feed roller 56 and separation roller 58, and are fed until the front edge thereof abuts against belt 50 and roller 52 in the same manner as in the paper feed operation from cassette 16. In this state, sheet 14A stands by.

Roller 52 is coupled to motor 36 (FIG. 2) through a clutch (not shown), and is rotated upon engagement of the clutch. Paper detector 60, for detecting the presence/absence of paper, is provided between register roller 52 and second feed roller 56. Detector 60 comprises first light-emitting diode (LED) 62, and first photosensor 64, for receiving light emitted from LED 62. When the front edge of sheet 14 shuts off light from LED 62, it abuts against the rolling contact portion of roller 52 and belt 50, a given time (e.g., 2 to 3 sec) after photosensor 64 is turned off. Thus, sheet 14 is appropriately bent.

In this bending of the sheet, the inclination of the front edge of sheet 14 (skew) can be corrected, and the front edge is reliably fed into the rolling contact portion of roller 52. Therefore, sheet 14 can be satisfactorily clamped between roller 52 and belt 50.

Note that dust removing brush 66, for removing paper dust attached to the circumferential surface of roller 52, is in sliding contact with the lower surface of roller 52, thus preventing the recording surface of sheet 14 from being contaminated.

Paper conveyor unit 48 comprises first and second floating sections 76 and 78. First floating section 76 incorporates first and second rollers 70 and 72, belt 50 looped between rollers 70 and 72, and air suction duct 74 in cover 68. Second floating section 78 comprises belt guide plate 80 and belt urging/separating mechanism 86, for urging belt 50 against or separating it from guide 84, and for guiding sheet 14 to thermal head 106 (to be described later).

In mechanism 86, belt guide plate 80 is pivotally supported at one end by hinge 88 in duct 74, and the other end thereof is biased downward by spring 90, thus urging belt 50 against guide 84. Attraction member 94 is mounted on the back surface of guide plate 80 to face electromagnetic coil 92. When coil 92 is energized, guide plate 80 is shifted against the biasing force of spring 90.

First floating section 76 is biased against roller 52 by spring 98, looped around roller 70 and having two ends fixed to housing 12, and guide plate 80 of second floating section 78 is elastically suspended by spring 90. Therefore, even if supplied sheet 14A is thick, sections 76 and 78 can be shifted accordingly.

High-viscosity fluid shock-absorber 100 is mounted on belt 80 of second floating section 78, to absorb shocks applied to belt 80.

Paper conveyor unit 48 is pivotally supported coaxially with the shaft of first roller 70, and can pivot in the direction indicated by arrow A to open a paper conveyance path. Therefore, if paper jam occurs midway along the conveyance path, the jammed paper or the cause of the jam can be removed with ease.

When roller 52 begins to rotate, the front edge of sheet 14 is clamped between roller 52 and belt 50 of first floating section 76, at an appropriate pressure, by the biasing force of spring 98. Then, sheet 14 is conveyed by the clamping and conveying force of rollers 52 and 70, and by the attraction and conveying force of belt 50.

In this case, sheet 14 is urged against guide 84 by mechanism 86, is guided to print unit 102, and is then slid along guide 84.

Figure 7:
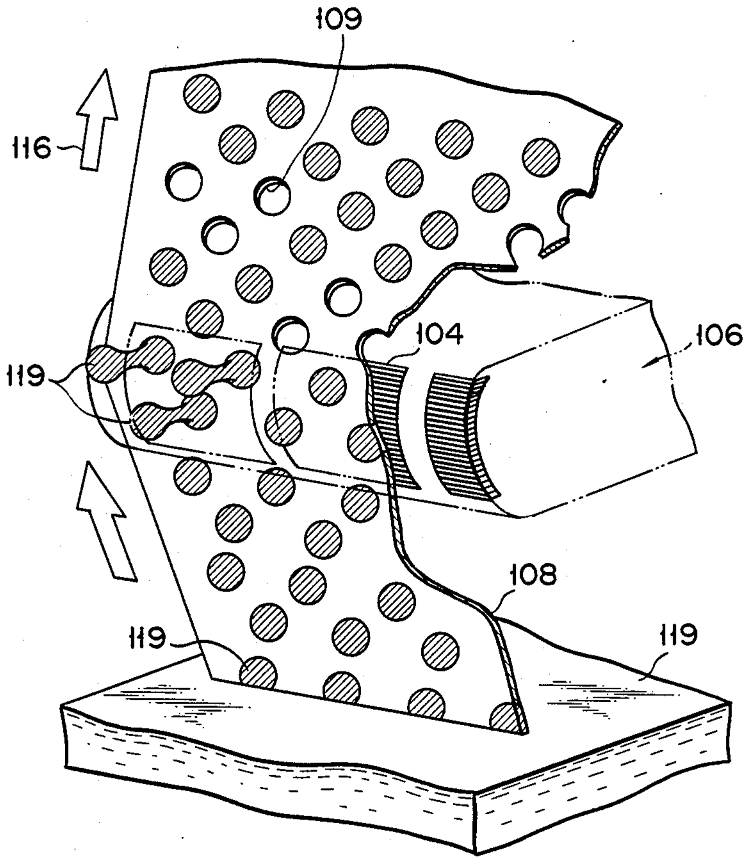
FIG. 7 is a perspective view for explaining an ink coating state in the print unit shown in FIG. 6.
Figure 8:
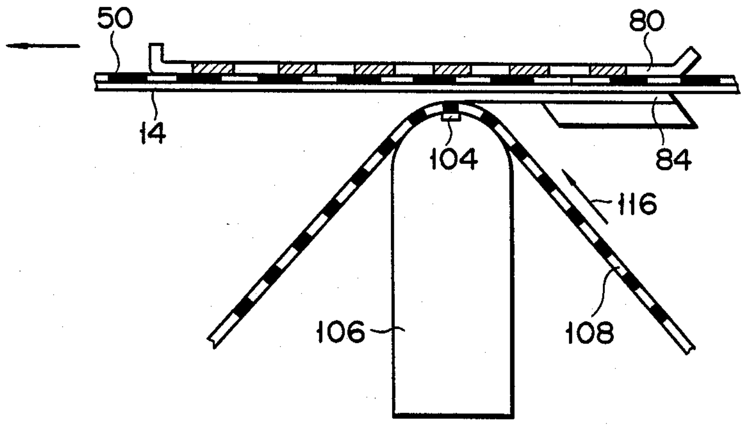
FIG. 8 is a side view for explaining an ink coating state in the print unit.

In print unit 102 ink is ejected onto sheet 14 conveyed to print unit 102, thus printing an image thereon. Print unit 102 is provided with thermal head 106, on top of which heating elements 104 are arranged. Elements 104 are heated in accordance with an image-forming signal from data processing apparatus 38. As shown in FIGS. 7 and 8, thermal head 106 is covered with ink film 108 as a printing medium in the printing state. Ink film 108 is formed of a metal, organic material, or the like (e.g., a nickel sheet as a hydrophilic material), and a large number of holes 109 having a diameter of about 10 to 200 μm are formed therein. The surface of ink film 108 facing sheet 14 is coated with polyethylene as a hydrophobic material. Ink film 108 is held in ink film cartridge 110, filled with ink and wound around a pair of rolls 112 and 114.

As shown in FIGS. 7 and 8, when print unit 102 conveys ink film 108 in the direction indicated by arrow 116, small holes 109 pass through ink reservoir 118 containing ink 119, and are filled with ink 119. When small holes 109, filled with ink 119, have reached thermal head 106 (having heating elements 104), heating elements 104 are selectively supplied with a voltage, to be heated quickly. Then, ink droplets are ejected due to pressure from bubbles, upon heating of heating elements 104, thus printing an image on sheet 14.

Guide 84 described previously is fixed with reference to thermal head 106, so that the surface of guide 84 is separated from heating elements 104 of head 106. In this case, the recording surface (lower surface) of sheet 14 is separated by a small gap (e.g., 0.2 mm) from the surface of film 108, which moves to contact heating elements 104 of thermal head 106. In this embodiment the gap between the surfaces of film 108 and sheet 14 is kept within the range of about 0.1 to 0.3 mm, when a resolution of 8 lines/mm is to be maintained.

If the gap is set to be 0.1 mm or less, when ink 119 soaks into sheet 14, the corresponding sheet portion expands, and is brought into contact with the surface of film 108, thus contaminating the recording surface with ink. Therefore, in this embodiment, reference projection 120 of thermal head 106 (FIG. 6) is urged against arm portion 121 of guide 84, to keep the gap strictly within the range of 0.2±0.05 mm.

Figure 9:
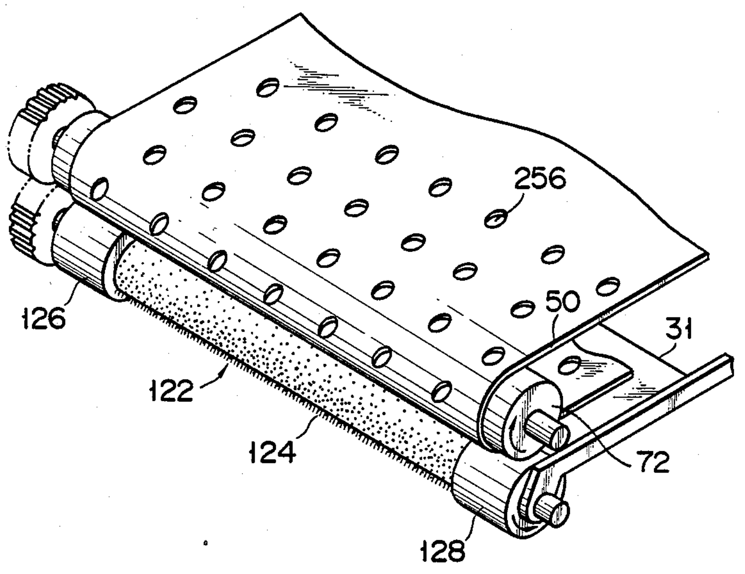
FIG. 9 is a partial perspective view of a paper discharging unit.

After printing, when the front edge of sheet 14 moves further forward, it is clamped between second roller 72 of first floating section 76, and paper discharge roller 122. In this case, as shown in FIG. 9, the recording surface of sheet 14 is supported by needle-shaped portion 124 having needles projecting from the circumferential surface of roller 122. Reference roller portions 126 and 128 are provided at two end portions of roller 122 and are in rolling contact with belt 50. Therefore, sheet 14 can be conveyed without receiving excessive pressure, thus protecting an undried image from deterioration. More specifically, since the ink ejected onto sheet 14 is not rubbed by the roller's surface, a clear image can be obtained.

Sheet 14 moves further forward and the rear edge thereof passes through the rolling contact portion between register roller 52 and first roller 70.

In this case, a force for urging sheet 14 against guide 84 is transmitted through mechanism 86, and belt guide plate 80, of second floating section 78, is pushed upward relative to the housing of first floating section 76, by a reaction force to plate 80 from guide 84, against the biasing force of spring 90, through shock-absorber 100.

After the rear edge of sheet 14 has passed between rollers 52 and 70, roller 52 and belt 50, which are temporarily separated, are again brought into rolling contact with each other by their own weight. Therefore, the pressure applied to sheet 14 is reduced to the total weight of plate 80 and the biasing force of spring 90, and sheet 14 can be smoothly conveyed.

If the rear edge of sheet 14 receives the total weight of paper conveyor unit 48, sheet 14 must be conveyed while receiving a large frictional force, resulting in unstable conveyance.

When sheet 14 moves further forward and the rear edge thereof has passed by the edge portion of guide 84 at the side of thermal head 106, guide plate 80 has already been pushed upward through shock-absorber 100, and can be moved downward slowly by the shock-absorbing effect of shock-absorber 100. Therefore, the rear edge of sheet 14 can pass by heating elements 104 of thermal head 106, while sheet 14 is approaching the surface of film 108.

If belt guide plate 80 does not receive any reaction force and is moved downward by its own weight and the biasing force of spring 90, immediately after the rear edge of sheet 14 passes through the edge portion of guide 84, the surface of film 108 is brought into contact with the recording surface of sheet 14, thus contaminating the rear edge of sheet 14 with ink.

In this embodiment, when the front or rear edge of sheet 14 falls within the range of about 6 mm from heating elements 104, forward and backward along the paper convey direction, electromagnetic coil 92 is energized to attract guide plate 80 upward. Then, sheet 14 separates from the surface of film 108, thus preventing the front or rear edge of sheet 14 from contacting the surface of film 108 when the front or rear edge of sheet 14 is folded or bent.

In this way, film 108 will not contact and contaminate sheet 14. In addition, sheet 14 passes by roller 122 while maintaining a small gap between belt 50 and film 108, and is discharged onto paper discharge tray 130 without being contaminated.

Detector 132, for detecting if sheet 14 has been discharged, is provided between rollers 122 and 72 at the side of tray 130. Detector 132 comprises second LED 134 and second photosensor 136, facing the paper conveyance path. When sheet 14 is discharged to tray 130 and the rear edge thereof passes by LED 134, a rising signal of photosensor 136 is detected to indicate that sheet 14 is discharged.

Ink supply, from ink tank 138 to film cartridge 110, and from ink reservoir 118 of cartridge 110 to ink film 108, will be described with reference to FIGS. 1 and 2.

As shown in FIG. 2, film cartridge 10 and ink tank 138 are detachably mounted. Ink 119 is stored in tank 138, which is screwed in and fixed to ink-tank mounting portion 140 of cartridge 110. Transparent ink supply tube 142, of tank 138, pushes valve 146, of cartridge 110, into tight contact with seal 144, for mounting portion 140 against the biasing force of spring 148.

Figure 6:
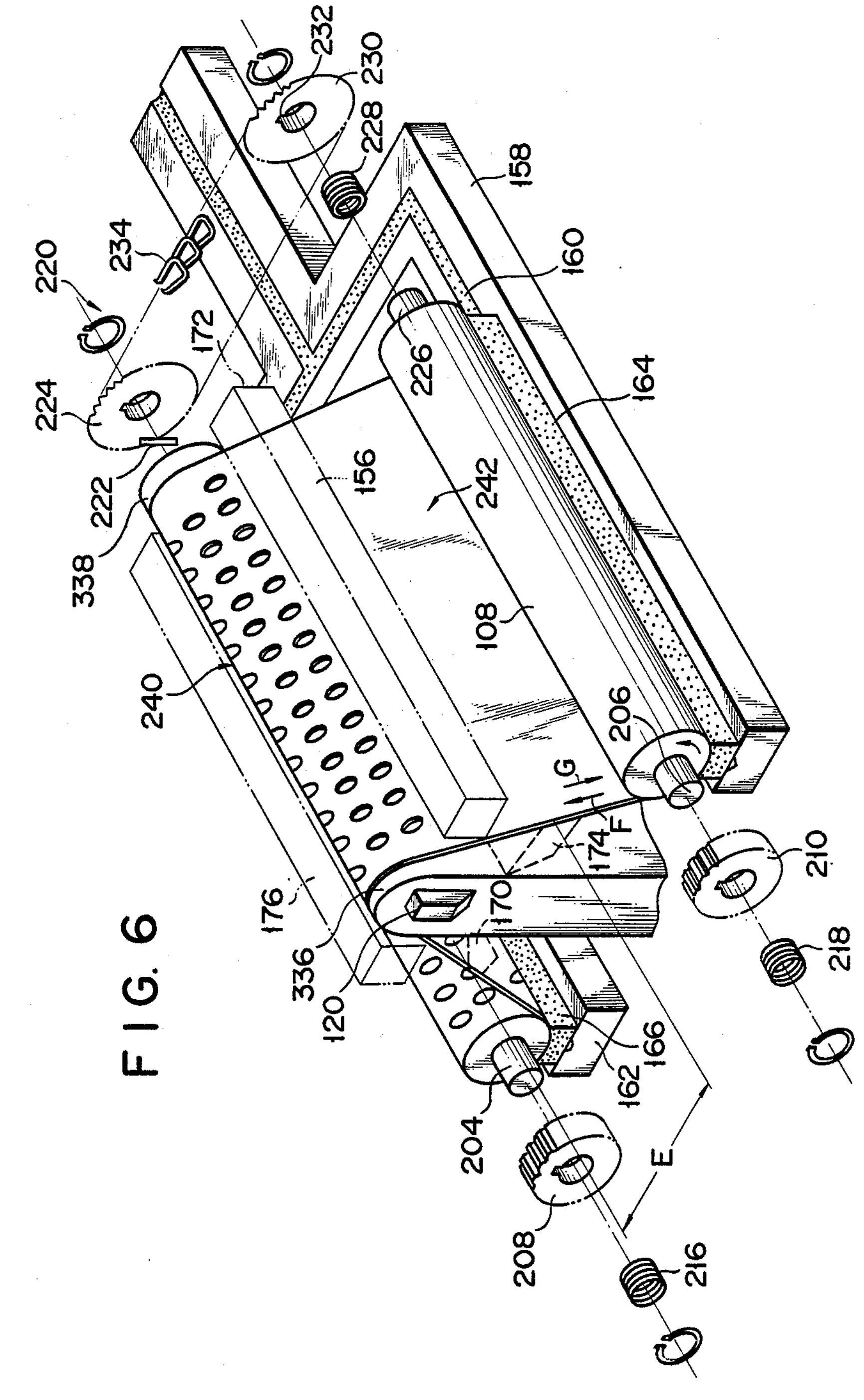
FIG. 6 is a perspective view of a print unit.

Valve 146 of cartridge 110 pushes ink-tank open/-close rod 150 upward and, therefore, pushes valve 152, of tank 138, against the biasing force of valve spring 154, thus supplying ink 119, in tank 138. Ink 119 is supplied from tank 138 until the obliquely cut distal end portion of tube 142 is filled with ink. Ink 119 is caused to flow into narrow ink supply paths 160 and 162, formed in container portion 158 of cartridge 119, through small holes formed in the surrounding portion of valve 146, of cartridge 110, and guide path 156, as shown in FIG. 6.

Ink 119 soaks into felt ink supply members 164 and 166, and is coated on film 108 therethrough. Therefore, as shown in FIG. 7, small holes 109 of film 108 are filled with ink 119, and ink droplets are formed by bubbles upon quick heating of heating elements 104.

In mounting portion 140, when ink 119 is consumed and the level of ink 119 drops below the obliquely cut distal end of tube 142 , air is taken from air suction path 168, formed in ink reservoir 118 of cartridge 110, into ink tank 138, thus supplying new ink 119.

Air suction path 168 id formed in the upper portion of mounting portion 140, so that its volume is set as small as possible, as can be seen from FIGS. 1 and 2. As will be described later, air communication with respect to ink reservoir 118 is allowed only when small holes 109 of film 108 pass by first and second excessive ink removing members 170, 172, 174, and 176 of elastic rubber, which also act as seal members. Thus, ink 119 can be refilled from tank 138 to ink reservoir 118 when film 108 is moved, but this operation is not permitted when cartridge 110 is exchanged or moved.

Thus, ink 119 will not be excessively supplied to cartridge 110 and thus, leaks are prevented.

As shown in FIGS. 1 and 2, since ink 119 is supplied to film 108 through felt ink supply members 164 and 166, it will not form a free surface as liquid in ink reservoir 118. Therefore, since ink 119 is trapped in felt fibers by its surface tension, it cannot leak outside cartridge 110.

The operation when tank 138 is demounted from mounting portion 140 of cartridge 110 will be described below.

When ink 119, in tank 138, is used up upon refilling thereof, the level of ink 119 drops further and reaches tube 142. In this case, light emitted from ink detection LED 177 is transmitted through tube 142, to turn to opposing ink detection photosensor 178, thus producing a detection signal. Thereby, a no-ink state of ink tank 138 can be detected.

Then, printer 10 displays the no-ink state on a display portion thereof, or on a display portion of data processing apparatus 38 connected thereto. When ink 119 is not supplied to head 106, the no-ink state of tank 138, i.e., a need for replacement of it, is signaled.

Ink tank 138 is thus replaced. In this embodiment, a demounting procedure and the operation of valve 152, of tank 138, and valve 146, of cartridge 110, are performed in a manner opposite that described previously.

More specifically, valve 146, of cartridge 110, moves upward and is brought into tight contact with the lower surface of seal 144 by the biasing force of spring 148, thereby preventing ink 119 in cartridge 110 from leaking therefrom.

Note that in this embodiment, tank 138 has a volume of about 100 cc, and, except for tube 142, is formed of a non-transparent material, in consideration of weather resistance. About 2,000 to 5,000 A4-size sheets can be printed at a normal recording density using about 100 cc of ink. Film cartridge 110 is preferably replaced after 100,000 A4-size sheets have been printed or after 3 years have passed, because of clogging of small holes 109, of film 108, due to paper dust, mold, dried ink, and the like. For this purpose, cartridge 110 and tank 138 are separately arranged. In addition, with the above structure, leakage or evaporation of ink 119 from tank 138 can be prevented.

Mounting of film cartridge 110 on printer 10 will now be described.

Figure 4:
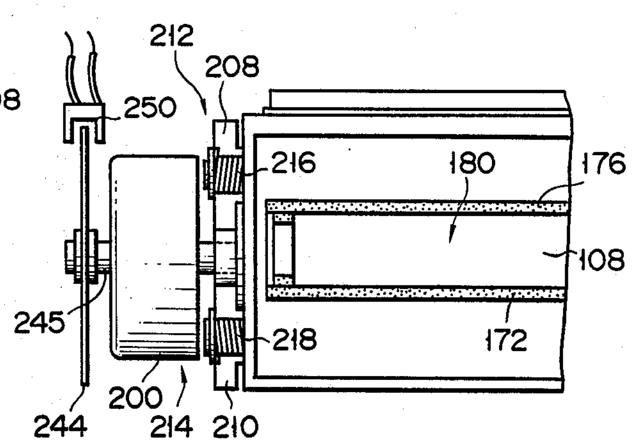
FIG. 4 is a plan view of the film conveyor unit shown in FIG. 3.
Figure 5:
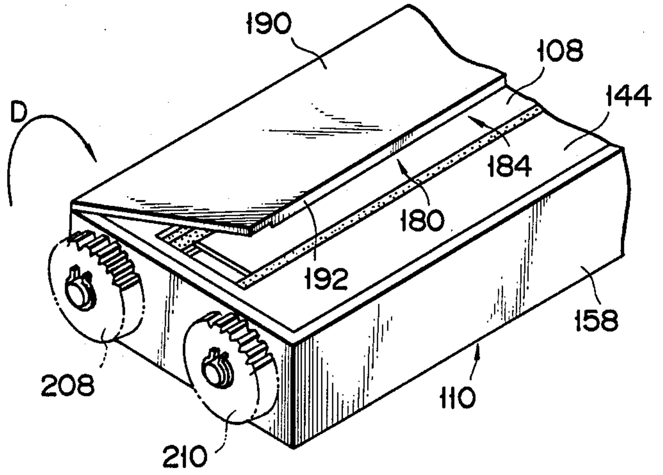
FIG. 5 is a partial perspective view of a film cartridge.

In printer 10, thermal head 106 is fixed to housing 12, and window 184 is formed in container 158, positioned at film exposing portion 180 of cartridge 110. Therefore thermal head 106 can be inserted therethrough to be set on housing 12, as shown in FIGS. 4 and 5.

As shown in FIG. 2, first supporting portion 186 of cartridge 110 is inserted in housing 12, and second supporting portion 188 thereof, provided at its other end, is pushed downward. In this case, cartridge fixing spring 189 is moved to the right in FIG. 2, and the recess portion of second supporting portion 188 is engaged with the head portion of spring 189, thereby fixing cartridge 110.

With the above arrangement of this embodiment, container 158, of cartridge 110, has a window, thus providing sufficient mechanical strength to cartridge 110.

As described above, cartridge 110 can be easily mounted or demounted, even if ink tank 138 is mounted thereon. The color of ink 119 can be changed simply by replacing cartridge 110. When cartridge 110 is mounted or demounted, guide plate 80 pivots upward, as indicated by arrow A in FIG. 1, and guide 84 pivots, as indicated by arrow B, to widely open the upper portion of cartridge 110, thus allowing easy removal of jammed paper in paper convey unit 48, and paper dust attached to film 108, and facilitating replacement of cartridge 110.

When cartridge 110 is demounted, in order to prevent leakage or evaporation of remaining ink 119 in cartridge 110, cartridge cover 190 is pivotally hinged on film exposing portion 180 of cartridge 110, as shown in FIG. 5, and pivots to cover film exposing portion 180, as indicated by arrow D. Projection 192 of cover 190 is in tight contact with first and second excessive ink-removing members 170, 172, 174, 176, thus providing a seal for cartridge 110.

As shown in FIG. 1, in this embodiment, a pair of ink-absorbing members 194 and 196 are arranged to be in contact with the lower portion of thermal head 106, thereby absorbing ink 119 flowing along the wall of thermal head 106. Therefore, ink leakage from head 106 can also be prevented.

The drive operation of ink film 108 will now be described.

Figure 3:
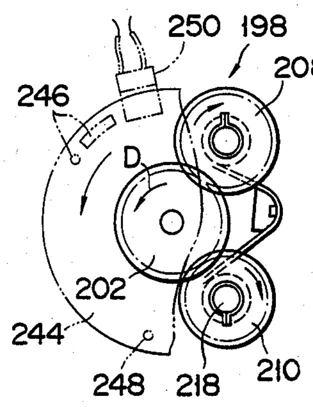
FIG. 3 is a side view showing one of the principal portions of a film conveyor unit of the printer shown in FIG. 1.

FIG. 3 is a side view of film drive mechanism 198, as a printing medium drive mechanism, and FIG. 4 is a plan view thereof. Film drive mechanism 198 comprises film drive motor 20 and gear 202 mounted on the shaft of motor 200. Gear 202 is meshed with gears 208 and 210 of a pair of rolls 204 and 206, around which film 108 is wound. One-way clutch 212 is interposed between roll 204 and gear 208, and one-way clutch 214 is similarly interposed between roll 206 and gear 210. Note that motor 200 can be rotated in the reverse direction, and ink film 108 can be moved upward or downward in FIG. 3.

As shown in FIG. 6, since one end of left-hand wind spring 216, fitted in film roll 204, is engaged with the recess portion of gear 208, when gear 208 is rotated clockwise, spring 216 is more tightly wound around roll 204, thus transmitting power from gear 208 to roll 204.

In this case, gear 210 causes right-hand wind spring 218, fitted in roll 206, to be loosened from roll 206. In this embodiment, however, since roll 206 and spring 218 are rotated in the same direction, they slip.

When film cartridge 110 is mounted or demounted, since gears 208 and 210 are separately meshed with motor gear 202, film 108 may be kept slack or an excessive tension may be continuously applied thereto. In the latter case, film roll 206 and spring 218 can slip to alleviate excessive tension.

As shown in FIG. 6, cartridge 110 is provided with film tension mechanism 220, for applying a given tension to film 108 at the side opposite rolls 204 and 206. Film tension mechanism 220 removes slack in film 108, and causes film 108 to be pressed against heating elements 104, of thermal head 106, at an appropriate pressure. Ladder wheel 224 is fixed to one end of roll 204 by pin 222, and left-hand wind torsion spring 228 is fitted in one end portion 226 of roll 206. The other end of torsion spring 228 is engaged with notch portion 232, of ladder wheel 230, which is coupled to wheel 224 through ladder chain 234.

Referring to FIG. 6, torsion spring 228 is twisted so that roll 206 is biased thereby counterclockwise, and roll 204 is biased thereby clockwise when ladder chain 234 is looped between ladder wheels 224 and 230. Therefore, an appropriate tension can be applied to film 108 in accordance with a torsion force (i.e., torque) from torsion spring 228. As a result, when film 108 is mounted on printer 10, it can be slidably moved to be in tight contact with the distal end portion of head 106 at an appropriate pressure, without being slackened.

A case will be described wherein gear 202 is rotated counterclockwise in FIG. 3.

In this case, gear 210 is rotated counterclockwise, and spring 218 is operated to be tightly wound around roll 206. Then, film 108 is moved in a direction to be taken up by roll 206. In this way, upon clockwise or counterclockwise rotation of motor 200, film 108 is reciprocated. In this embodiment, slackening of film 108 can be prevented upon operation of springs 218 and 216 and mechanism 220, when cartridge 110 is mounted or demounted, and film 108 or thermal head 106 will not be damaged due to excessive tension.

Figure 10:
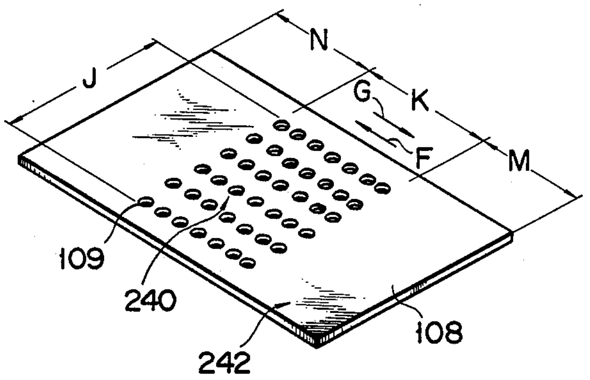
FIG. 10 is a partial perspective view of the ink film.

As shown in FIG. 10, region 240 having a large number of holes 109 and regions 242, which have no holes and are formed at two sides thereof, are formed on film 108. When the printing operation is performed, region 240 must face heating elements 104. When the printing operation begins, the front end portion of region 240, in the film moving direction, reaches heating elements 104. Therefore, film position detection mechanism 250, for detecting the front and rear end portions of region 240 of film 108, is provided in film drive mechanism 198.

As shown in FIGS. 3 and 4, in detection mechanism 250, detection wheel 244, for detecting a film position, is mounted on drive shaft 245 of motor 200. In wheel 244, first and second slits 246 and 248 are formed at positions corresponding to two boundary portions of region 240 of film 108, i.e., the front and rear end portions in the film moving direction. First slit 246 consists of an elongated hole and a round hole, and second slit 248 consists only of a round hole. Position detector 250, for detecting the positions of slits 246 and 248 with light, is arranged to sandwich the edge portion of wheel 244.

When motor 200 is rotated, position detector 250 senses short and long light pulses formed by holes of slit 246, and compares them with a constant clock pulse incorporated in the electric control circuit (not shown). As a result, detector 250 detects, at the rear end of the elongated hole, along the clockwide direction, that the detected slit is first slit 246. When detector 250 senses a single light pulse transmitted through slit 248, it can detect that the detected slit is second slit 248. Motor 200 receives a stop signal from control circuit 252 when detector 250 detects first slit 246.

When motor 200 is stopped, region 242, of film 108, (FIG. 10) covers film exposing portion 180, of cartridge 110, and region 240 is stored in ink reservoir 118, below ink removing members 172 and 174, provided to cartridge 110. Since cartridge 110 is covered with region 242, it can be sealed from the outer atmosphere.

In this way, evaporation of ink 119 in cartridge 110, which causes an increase in viscosity of ink 119, can be prevented. If the viscosity of ink 119 is increased, the ejection speed of ink droplets from holes 109 is decreased or, in the worst case, ejection therefrom is prevented.

Print unit 102 receives a printing command from data processing apparatus 38 (not shown), connected to printer 10, for processing image or character data, and drives first feed rollers 20 to supply recording sheet 14 to paper convey unit 48. When motor 200 is rotated counterclockwise in the direction indicated by arrow D in FIG. 4 by a predetermined number of pulses, film 108 is moved for a predetermined period of time. The front end portion of region 240, of film 108, in the film moving direction, is thus positioned at heating elements 104, and awaits arrival of recording sheet 14 in order for the front end portion of region 240 to coincide with the front edge of sheet 14. Thereafter, film 108 is moved in synchronism with movement of sheet 14. The moving speed of film 108 (20 mm/sec) is half that of sheet 14 (40 mm/sec).

Figure 11:
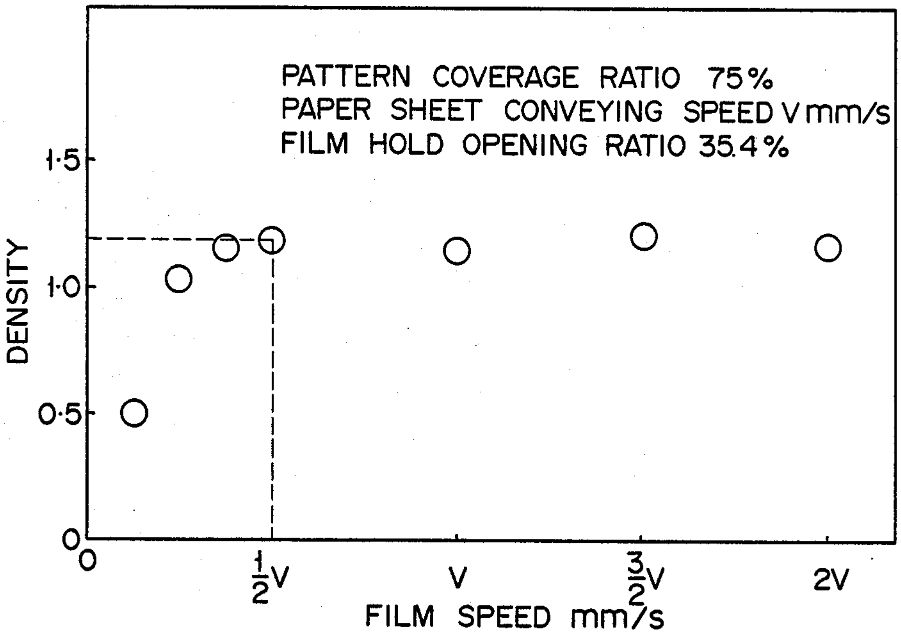
FIG. 11 is a graph showing the relationship between film speed and recording density according to the embodiment of the present invention.

As shown in FIG. 11, when the moving speed of sheet 14 is varied within the range of 10 to 100 mm/sec, if the moving speed of film 108 is v/4 or higher with respect to moving speed v of sheet 14, the recording density of sheet 14 can be 1.0 or more (black solid, hole opening ratio 34.5%, coverage ratio of the printing portion to the sheet 75%), regardless of the moving direction of sheet 14 relative to film 108. Note that the hole opening ratio is the ratio of hole area to film area.

Therefore, the moving distance of film 108 can be made shorter than the recording length (recording direction) of sheet 14, the area of region 240 can be reduced, and film 108 can be manufactured with ease. If region 240 has a large area, it is difficult to form uniform-diameter holes (25 to 30 μm) over the entire area of region 240. Therefore, the diameter of holes 109 is reduced at, e.g., surrounding portions, resulting in irregular recording density. However, in this embodiment, the area of region 240 can be reduced, thus obtaining a regular, uniform image.

When film 108 is subsequently moved, the rear end of region 240 reaches heating elements 104 from the side of removing members 172 and 174. Film position detector 250 then detects second slit 248. In this case, in order to satisfy the above relationship between the respective positions of film 108 and first and second slits 246 and 248, of wheel 244, film 108 must be wound at the side of members 172 and 174 upon setting of cartridge 110. In addition, motor 200 must be stopped upon detection of the round hole of first slit 246 by detector 250.

When sheets 14 are continuously supplied and nth sheet 14 (n is an even integer) is subjected to recording, film 108 is wound until the rear end of region 240, at the side of members 172 and 174, reaches roll 204, to be filled with ink 119. Thereafter, film 108 is moved in a direction opposite to the film moving direction, as described above. Arrival of the rear end of region 240 is awaited for a predetermined period of time, to align the front end of sheet 14 with the rear end of region 240, and film 108 and sheet 14 are then fed in synchronism with each other for recording.

When (n+1)th sheet 14 is to be recorded, the other end of region 240, at the side of members 170 and 176, is wound around roll 206 to be filled with ink 119, and is then returned to heating elements 104. After the corresponding end of region 240 is aligned with the front edge of sheet 14, film 108 is moved.

Since the recording operation is performed by the reciprocal movement of film 108, continuous recording is enabled.

First and second excessive ink-removing members 170, 174, 176, and 172 are alternately arranged to be in contact with film 108, and second members 174 and 176 are arranged above first members 170 and 172.

Since film rolls 206 and 204 are arranged below the top of thermal head 106, print unit 102 can be rendered compact, and sheet 14 can be conveyed while strictly maintaining a gap between sheet 14 and heating elements 104. In addition, when rolls 204 and 206 are arranged below first members 170 and 172, arranged at the side of thermal head 106, the distance between second members 174 and 176 can be reduced, and the area of film exposing portion 180 can also be reduced. Therefore, a compact film cartridge 110 can be provided.

A case will be described wherein film 108 is moved in the direction indicated by arrow G in FIG. 6. Film 108, filled with ink 119 through ink reservoir 118, is moved upward, and excessive ink is removed from film 108 by first excessive ink-removing member 170. However, during the recording operation, since region 240 passes by member 170, excessive ink 119 is moved at a constant level to the side opposite thermal head 106, through region 240.

Ink 119 moved to the opposite side is removed by second excessive ink-removing member 174, and is then transferred to the side of thermal head 106. When film 108 is moved in the direction indicated by arrow G and region 240 passes by members 170 and 174, the sufficient amount of ink 119 can be coated not only on holes 109 but on the entire surface of film 108.

Therefore, this reduces the film moving speed to ¼that of sheet 14.

A case will be described when region 240 is moved downward along members 170 and 174. First, ink on the recording surface side of film 108 is removed by member 172. Therefore, dust or paper powder attached to film 108 is removed as well as excessive film 119 attached thereto. In this case, ink 119 left on the distal end portion of member 174 is moved to the side of thermal head 106 through holes 109 of region 240, and is again removed by member 170, thus being left on the distal end portion of member 170.

Ink 119 removed and left on the distal end portion of member 170 is then moved to the side opposite to thermal head 106, through holes 109 of region 240. In this way, excessive ink 119 is recovered in ink reservoir 118 of cartridge 110.

When region 242, of film 108, passes by members 170 and 174, in a direction indicated by arrow F in FIG. 6 (i.e., downward), the surface of film 108 opposite thermal head 106 is already cleaned by member 176, and need not be cleaned by member 174. However, paper powder and rubber dust are deposited on the distal end portion of member 174.

The surface of film 108 at the side of head 106 is also cleaned by member 172, and need not be cleaned by member 170.

When region 242, of film 108, covers film-exposing portion 180 of cartridge 110, the exposed portion of film 108 is cleaned, and the operator need not soil his hands with ink.

Figure 14:
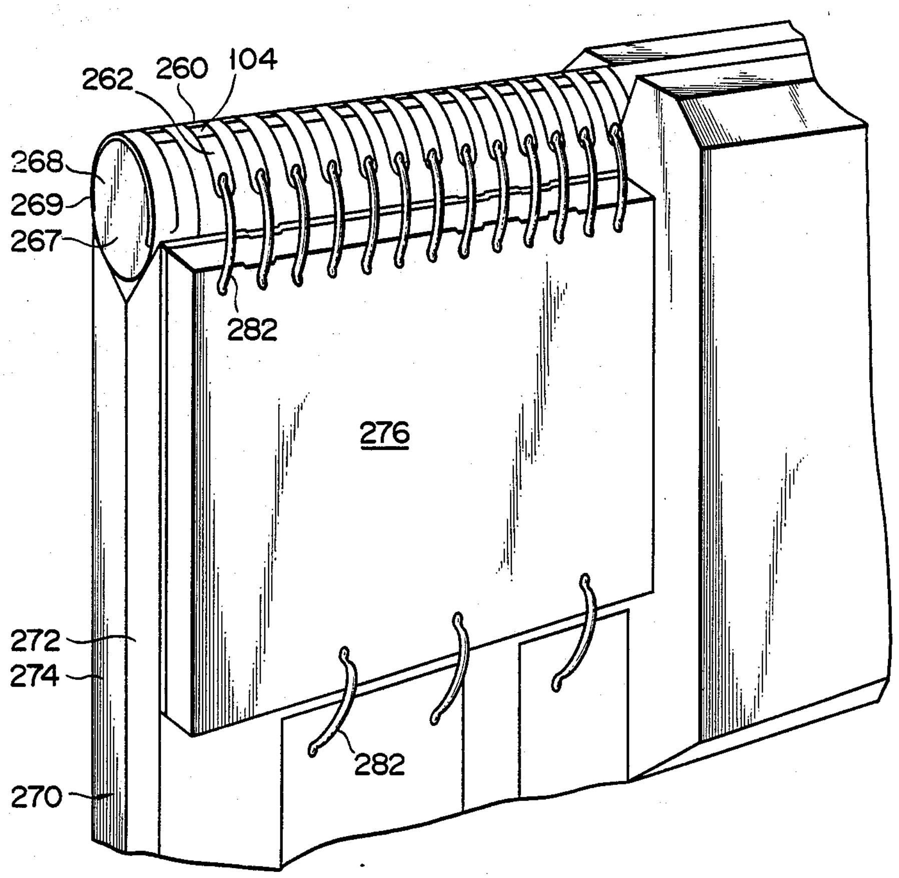
FIG. 14 is a perspective view showing a principal part of a thermal head according to the first embodiment of the invention.

As shown in FIG. 14, since lengths M and N of regions 242 of film 108 are set to be longer than film exposing width E (FIG. 6) of cartridge 110, air communication through a gap between first and second excessive ink-removing members 170, 172, 174, and 176 can be prevented. Thus, ink 119 can be protected from evaporation, and the viscosity thereof will not be changed, thus providing a clear image.

An operation for removing paper dust attached to film 108 will be described.

When film 108 is moved in the direction indicated by arrow G (FIG. 6), paper powder and dust attached to the distal end portion of member 176 are also moved, together with film 108, and then reach heating elements 104, of head 106. Film 108 is clamped between heating elements 104, and is slightly reciprocated several times. At the same time, suction fan 254 (FIG. 2) is energized to attract paper particles or dust on film 108, and draws them into air-suction guide 258, through suction hole 256 (FIG. 9) of belt 50.

As a result, paper powder or dust attached to film 108 can be removed, thus preventing clogging of holes 109 of region 240, of film 108.

In this embodiment, since the paper-powder is removed about thirty seconds after a series of successive recording operations, the print operation will not be adversely influenced.

When region 242, of film 108, is exposed from cartridge 110, the paper powder-removing procedure is executed. Therefore, ink 119 will not be drawn into guide 258 nor become attached to belt 50.

The operation of film 108 after a series of recording operations by print unit 102 will be described.

After the series of recording operations are completed, film 108 is moved at a lower speed than in a recording mode, for a predetermined period of time (several seconds). This prevents ink 119 from being dried by heat from heating elements 104, of head 106, before the recording operation is completed. Next, the paper powder-removing procedure is carried out for about 10 seconds, and film-exposing portion 180, of cartridge 110, is then covered with region 242, of film 108.

First excessive ink-removing members 170 and 172 are formed of an elastic member, and the edges thereof, at the side of thermal head 106, are in tight contact with thermal head 106, at the lower surface of film 108. As a result, ink 119 flowing down along the wall of head 106 can be recovered in ink reservoir 118, of cartridge 110, through holes 109 of region 240, of film 108. Since members 170, 174, 176, and 172 are formed of a material that is impermeable to air, communication between ink 119 inside cartridge 110 and air outside cartridge 110 can be prevented.

The relationship between the diameter of holes 109, of film 108, and the pitch therebetween will be explained with reference to FIG. 12.

Figure 12:
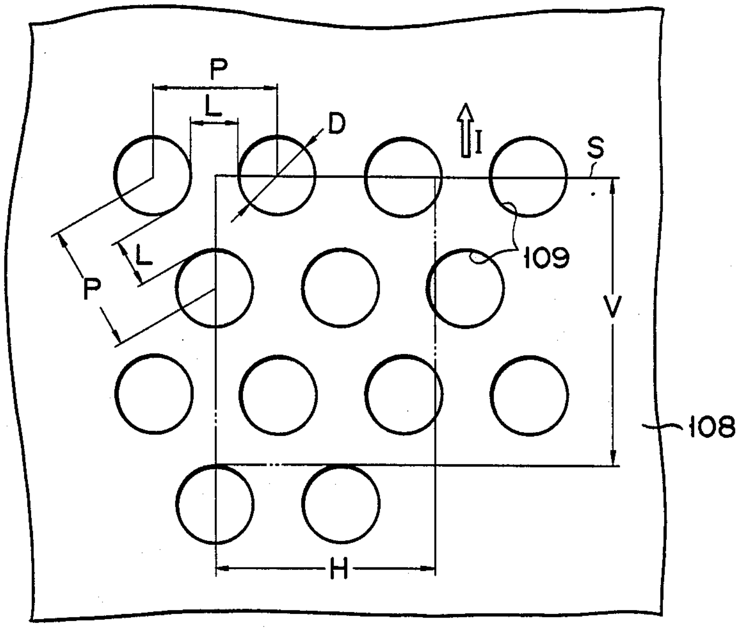
FIG. 12 is a partial plan view of an ink film.

Referring to FIG. 12, arrow I indicates the moving direction of film 108, and three adjacent holes 109 are arranged to form a regular triangle. In FIG. 12, reference symbols H and V indicate dimensions of heating elements 104, which are respectively 100 $\mu m$ to 125 $\mu m$. Reference symbol D denotes the diameter of hole 109, which is 25 $\mu m$; P, the pitch between the centers of adjacent holes 109, which is 45 $\mu m$; and L, the minimum distance between adjacent holes 109, which is 20 $\mu m$. From the tests, it was found that when the maximum distance between adjacent holes 109 was given by P, relations $H > 2P$ and $V > 2P + D$ were satisfied. In addition, in the case of a resolution of 8 lines/mm, when diameter D, of hole 109, fell within the range of $D = 15$ to 35 $\mu m$, and P fell within the range of $P = 40$ to 50 $\mu m$, good printing quality could be obtained.

Referring now to FIGS. 13 to 16, thermal head 106, according to a first embodiment of the present invention, will be described in detail.

Figure 13:
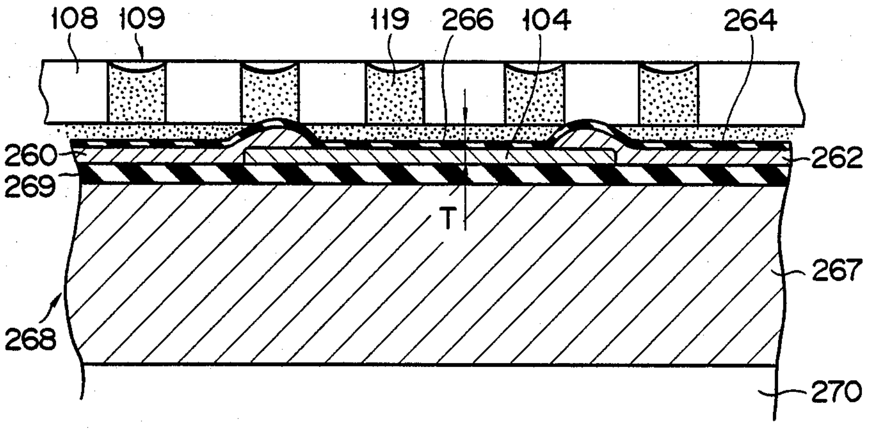
FIG. 13 is a partial sectional view for explaining the arrangement of an energizing element portion of the thermal head with regard to the ink film.

FIG. 13 is a cross-sectional view showing a principal part of thermal head 106 and a film.

FIG. 13 shows a cross section of thermal head with regard to the ink film.

Heating elements 104, and electrical conductors (lead-out electrodes) 260 and 262 are covered with wear-resistant thin insulating film 264 of aluminum oxide ($Al_2O_3$). When a voltage is applied to heating elements 104 to quickly heat them, bubbles are formed from elements 104. Ink 119 filled in holes 109 is immediately ejected due to the pressure of the bubbles, thus achieving the printing operation. In this embodiment, resistance is set at 300 Ω, and the 24 V voltage of pulse width of 10 μ/sec is applied to elements 104 to eject ink. 2,100 ergs per heating element are consumed.

When thickness T of gap 266, between heating elements 104 and film 108, exceeds 3 $\mu m$, ink ejection power is substantially uniform, and good printing quality can be obtained. However, if thickness T exceeds 10 $\mu m$, ejection power is reduced and printing quality is degraded. When thickness T is below 3 $\mu m$, energy consumption per heating element 104 exceeds 2,100 erg, and the lesser is the thickness T, the greater is the energy required. In this embodiment, thickness T is set to be 3 $\mu m$. Note that in FIG. 13, reference numeral 269 denotes a glazed glass layer. As a material for heating element 104, a metallic oxide thin film, which contains ruthenium oxide as a major component and 0.6 to 2.0% (atomic ratio: M/Ru [ruthenium]) of M (M is at least one element selected from the group consisting of Ca [calcium], Sr [strontium], Ba [barium], Pb [lead], Bi [bismuth], and Tl [thallium]) is used.

When the metallic oxide thin film is used, a change in resistance due to oxidation can be prevented. Therefore, high electric power can be applied to heating elements 109 to heat them to high temperatures, regardless of the change in resistance, and stability over long-term use can be assured. Since the metallic oxide thin film used for heating elements 104 has a relatively high resistance, only a small current is required to obtain high heating density. For this reason, current flowing through a conductive layer connected to a heating resistor is reduced, and heat generation from this portion can be suppressed. Therefore, so-called image blurring during the printing operation can be prevented. In addition, since the thin film has a positive resistance-temperature coefficient, a large current can be initially applied thereto to achieve high-speed printing.

Figure 16:
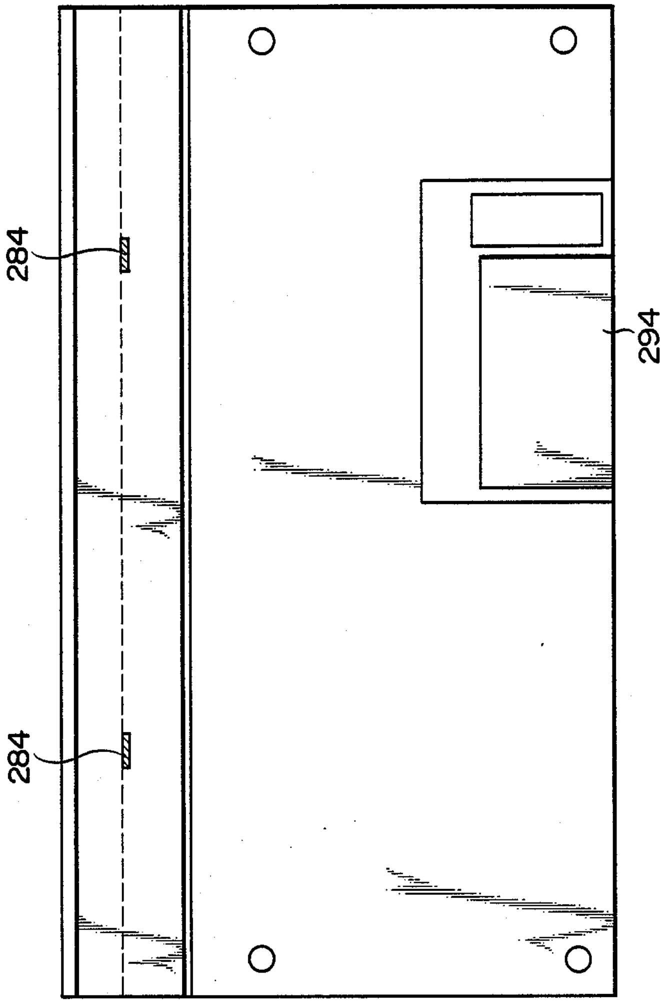
FIG. 16 is a schematic plan view of the thermal head shown in FIG. 14.
Figure 15:
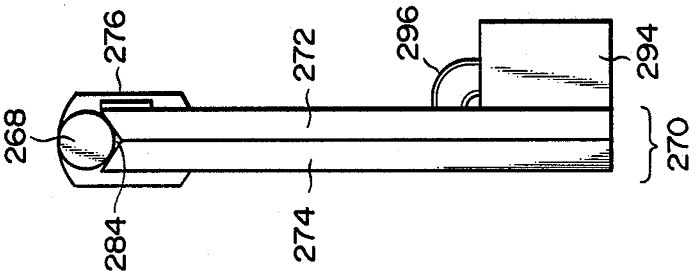
FIG. 15 is a schematic side view of the thermal head shown in FIG. 14.

As shown in FIGS. 14 to 16, rod-shaped mounting member 268 includes round rod 267 of molybdenum as a metal material, and glazed glass layer 269 formed as an insulating layer on the peripheral surface of rod 267. Copper, copper-based alloy, stainless steel, nickel, or nickel-based alloy may be used as the material for member 268, as alternatives to using molybdenum. Glass layer 269 is deposited to a thickness of approximately 20 micrometers on that portion of the peripheral surface of rod 267 on which are to be arranged heating elements 104 and electrical conductors 260 and 262. That portion of the peripheral surface of rod 267 on the opposite side to heating elements 104 is bonded to and supported by the distal end portion of support member 270. Member 270 is formed of glass-epoxy plate 272 and aluminum plate 274 pasted together.

Since mounting member 268, which carries heating elements 104 thereon in the aforesaid manner, is in the form of a round rod with a circular cross section, so, therefore, elements 104 can be somewhat dislocated without causing any problem due to an allowance being created between member 268 and said heating elements 104.

Composed of glass-epoxy plate 272 and aluminum plate 274, moreover, support member 270, for supporting molybdenum rod 267, is one percent or less of the conventional ceramic substrate, in material cost.

Driver unit 276 is bonded to glass-epoxy plate 272 of support member 270, adjoining mounting member 268. Circuit board 278, of unit 276, which is provided with control circuit 280 (mentioned later), selectively supplies electric power to electrical conductors 262, thereby heating those heating elements 104 corresponding to an image-forming signal. Driver unit 276 and conductors 262 are connected individually by means of gold wires 282. In this case, conductors 262 and unit 276 can be connected through use of the wires alone because unit 276 is located close to member 268. Thus, according to this embodiment, these components can be directly connected without requiring such a fine pattern circuit as is formed on the prior art substrate on which heating elements 104 are arranged. Driver unit 276 is provided, on its signal input side, with input terminals whose ratio to output terminals is one to five. The image forming signal is applied to the input terminals through conducting wires 282, for input. Since the ratio of the input terminals to the output terminals of the driver is one to five or thereabout, a sufficiently wide wiring pattern can be formed on glass-epoxy plate 272 of supporting member 270. Thus, there is no possibility of pattern breakage.

Now let us consider the distribution of energy consumption in mounting member 268. Most (about 90 percent or more) of energy consumed by pulsative heating of heating elements 104 is accumulated in member 267, ink film 108, etc., without being used in the ejection of ink 119 from film 108. The accumulation of heat raises the temperature of film 108 and ink 119 close to the boiling point of the ink. Accordingly, the manner of ink ejection depends on the presence of heat accumulation. In other words, if recording is subject to thermal hysteresis, recorded images will suffer unevenness in density. In the case of the prior art thermal head using glass material for the mounting member for the heating elements, therefore, a substantial amount of heat is liable to be confined, thereby causing the above problem, since the thermal conductivity of glass is as low as 0.002 cal/(cm·s·°C.). Thereupon, according to the present invention, a metal material with higher thermal conductivity is used for mounting member 268. In the first embodiment, in particular, the mounting member is covered by glazed glass layer 269, which is used as an insulating film, that is formed on the peripheral surface of the round rod. The thermal expansion coefficient of glass layer 269 is approximately $23\times10^{31\ 6}$/°C., while that of molybdenum is $5\times10^{31\ 6}$/°C. These figures can be regarded as substantially equal. Thus, the glass layer is prevented from cracking due to the difference in thermal expansion coefficient.

The thermal conductivity of glazed glass layer 269 is approximately 0.002 cal/(cm·s·°C.), while that of molybdenum is approximately 0.35 cal/(cm·s·°C.), which is about 150 times as high as that of the glass layer. Therefore, heat can scarcely accumulate in molybdenum material, so that the adverse effects of accumulated heat can be effectively prevented. Moreover, molybdenum has higher adhesion to glass than any other metal.

In the present embodiment, moreover, aluminum plate 274, with high thermal conductivity, constitutes half of support member 270. Accordingly, heat energy produced in heating elements 104 and accumulated in molybdenum rod 268 can be quickly transmitted to aluminum plate 274 and diffused for cooling. Thus, unevenness of print can be greatly reduced.

In this embodiment, as shown in FIG. 14, support member 270 is formed by pasting together glass-epoxy plate 272 and aluminum plate 274. Two thermistors 284, as temperature sensing elements, are mounted between a V-shaped end face of member 270 and mounting member 268, on which heating elements 104 are formed.

It is therefore possible to accurately detect the temperature of molybdenum rod 268, and hence the difference between the temperature at the start of operation of thermal head 106 and that at the equilibrium between heat generation and radiation during continuous operation, as well as variation of equilibrium temperature attributable to atmospheric temperature change. Thus, the temperature of thermal head 106 can be kept constant by only slightly changing the current applied to heating elements 104.

In this embodiment, support member 270 is formed of glass-epoxy plate 272, with driver unit 276 thereon, and aluminum plate 274 pasted together. Alternatively, the support member may be a two-layer structure in which a thin substrate of polyimide or the like, carrying driver unit 276 thereon, is pasted onto a thick substrate.

Figure 17:
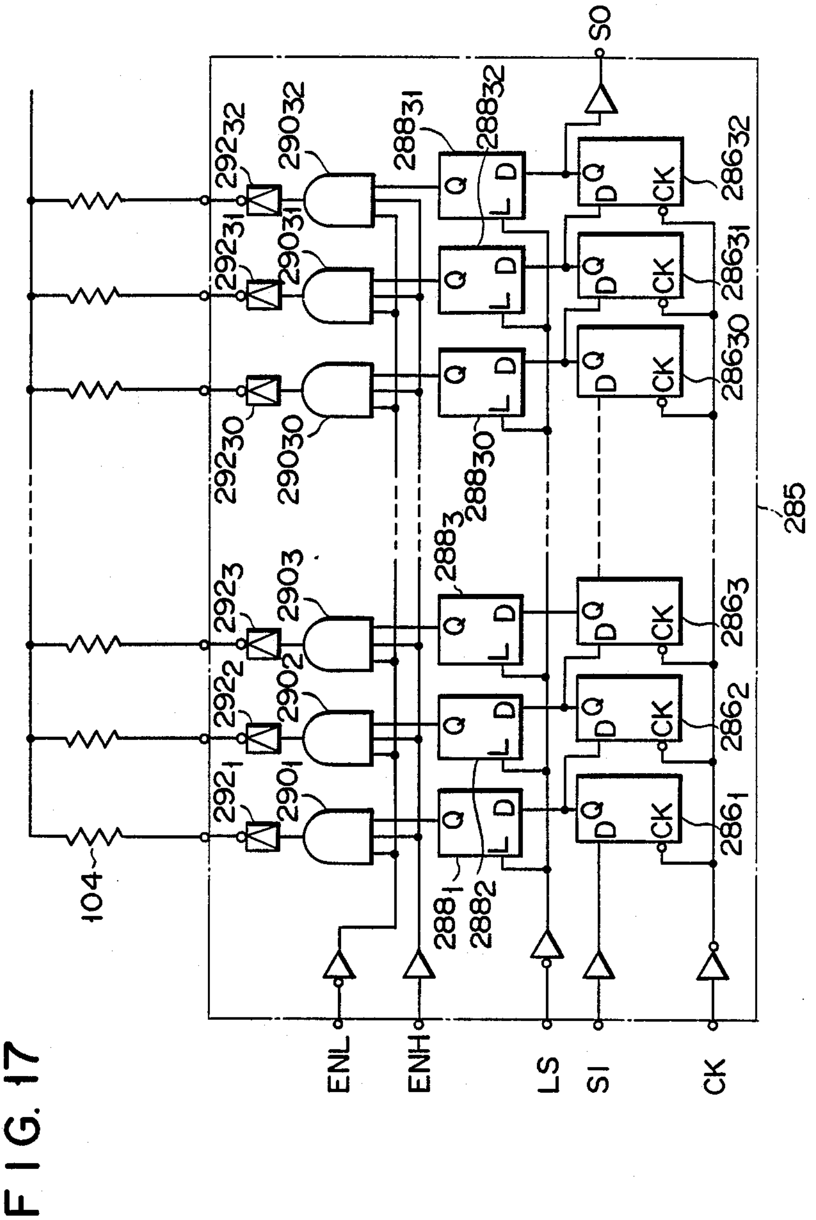
FIG. 17 is a logic diagram of the drive control unit of the thermal head.

Driver unit 276 comprises a plurality of driver ICs 285 of a circuit configuration, as shown in FIG. 17. Each IC 285 can drive 32 heating elements 104. Thermal head 106 of the present invention separately drives 54 such ICs 285. The driver IC includes 32 D flip-flops $286_1$ to $286_{32}$, latch circuits $288_1$ to $288_{32}$, AND circuits $290_1$ to $290_{32}$, and drivers $292_1$ to $292_{32}$. Clock signal CK and input signal SI are applied, through a buffer, to clock input terminal CK and input terminal D, respectively, of flip-flop $286_1$. An output signal from output terminal Q of flip-flop $286_1$ is supplied to input terminal D of flip-flop $286_2$ in the next stage, and also to input terminal D of latch circuit $288_1$. An inverted version of latch signal LS is applied, through a buffer, to latch input terminal L of latch circuit $288_1$. An output signal from output terminal Q, of circuit $288_1$, is supplied to AND circuit $290_1$. Circuit $290_1$ is also supplied, via a buffer, with inverted versions to enable high signal ENH and enable low signal ENL. The output of circuit $290_1$ is fed to driver $292_1$.

In each of D flip-flops $286_2$ to $286_{32}$, in subsequent stages, clock signal CK is supplied to clock input terminal CK, through a buffer, as in flip-flop $286_1$. Input terminals D of flip-flops $286_2$ to $286_{31}$ are supplied with output signals from output terminals Q of individually preceding flip-flops $286_1$ to $286_{30}$. Output signals from output terminals Q of flip-flops $286_2$ to $286_{31}$ are supplied to input terminals D of individually succeeding flip-flops $286_3$ to $286_{32}$. Clock signal CK is applied, through a buffer, to clock input terminal CK of final flip-flop $286_{32}$, and an output signal from its output terminal Q is delivered, via a buffer, as signal SO to driver IC 285, in the next stage.

Latch circuits $288_2$ to $288_{32}$, AND circuits $290_2$ to $290_{32}$, and drivers $292_2$ to $292_{32}$ have the same configurations and functions as latch circuit $288_1$, AND circuit $290_1$, and driver $292_1$, respectively, provided input terminals D of the latch circuits are supplied with output signals from their corresponding D flip-flops.

With this arrangement of driver ICs 285, heating elements 104 are driven, to generate heat, with delays of, for example, about 2 to 3 microseconds between the groups of elements 104. Thus, simultaneous heat generation is prevented. In FIGS. 15 and 16, numerals 294 and 296 designate a capacitor and a conducting wire, respectively.

Referring now to FIGS. 18 to 25, alternative embodiments of the present invention will be described. In these drawings, like reference numerals refer to the same portions as in the first embodiment, and a detailed description of these portions will be omitted.

Figure 19:
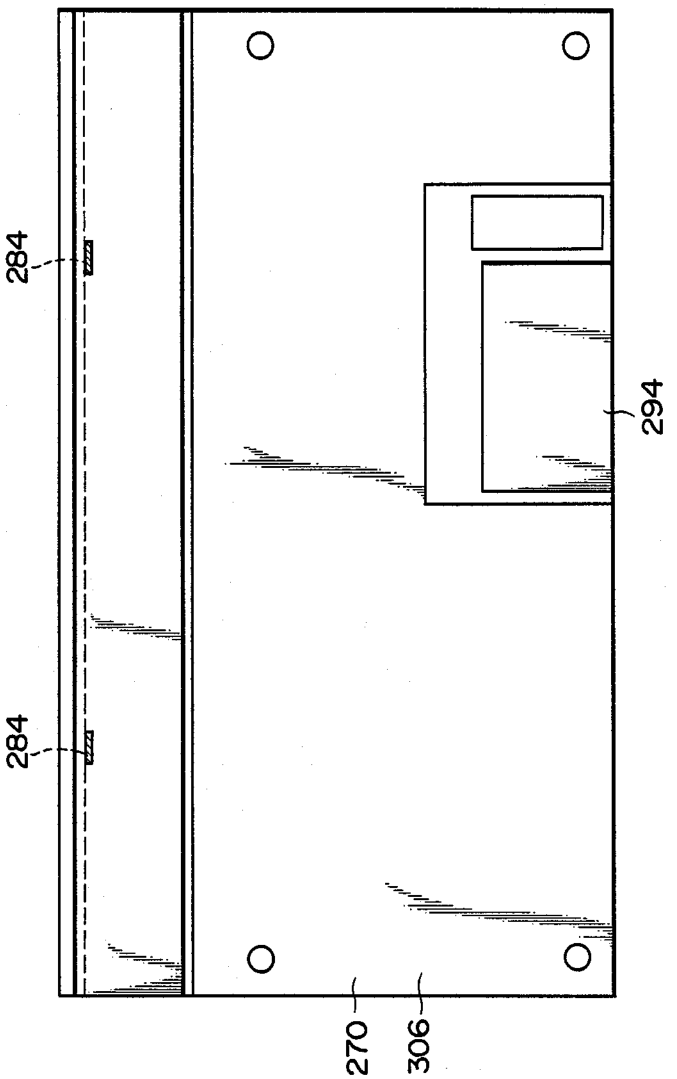
FIG. 19 is a schematic plan view of the thermal head shown in FIG. 17.
Figure 18:
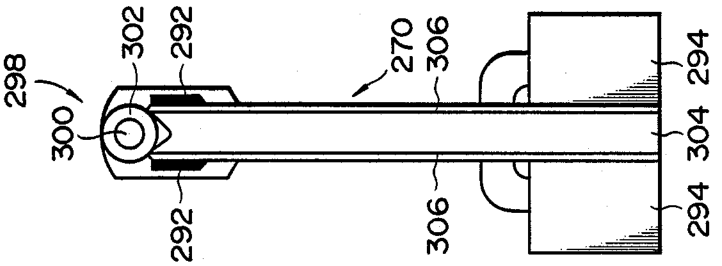
FIG. 18 is a schematic side view of a thermal head according to a second embodiment of the invention.
Figure 21:
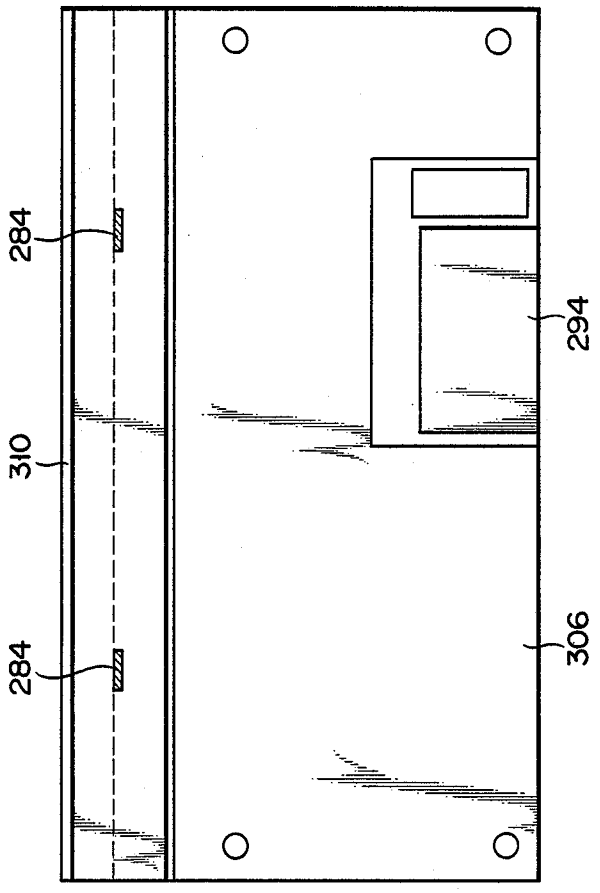
FIG. 21 is a schematic plan view of the thermal head shown in FIG. 20.
Figure 20:
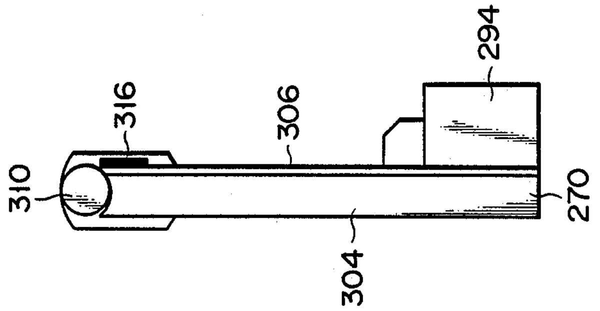
FIG. 20 is a schematic side view of a thermal head according to a third embodiment of the invention.
Figure 22:
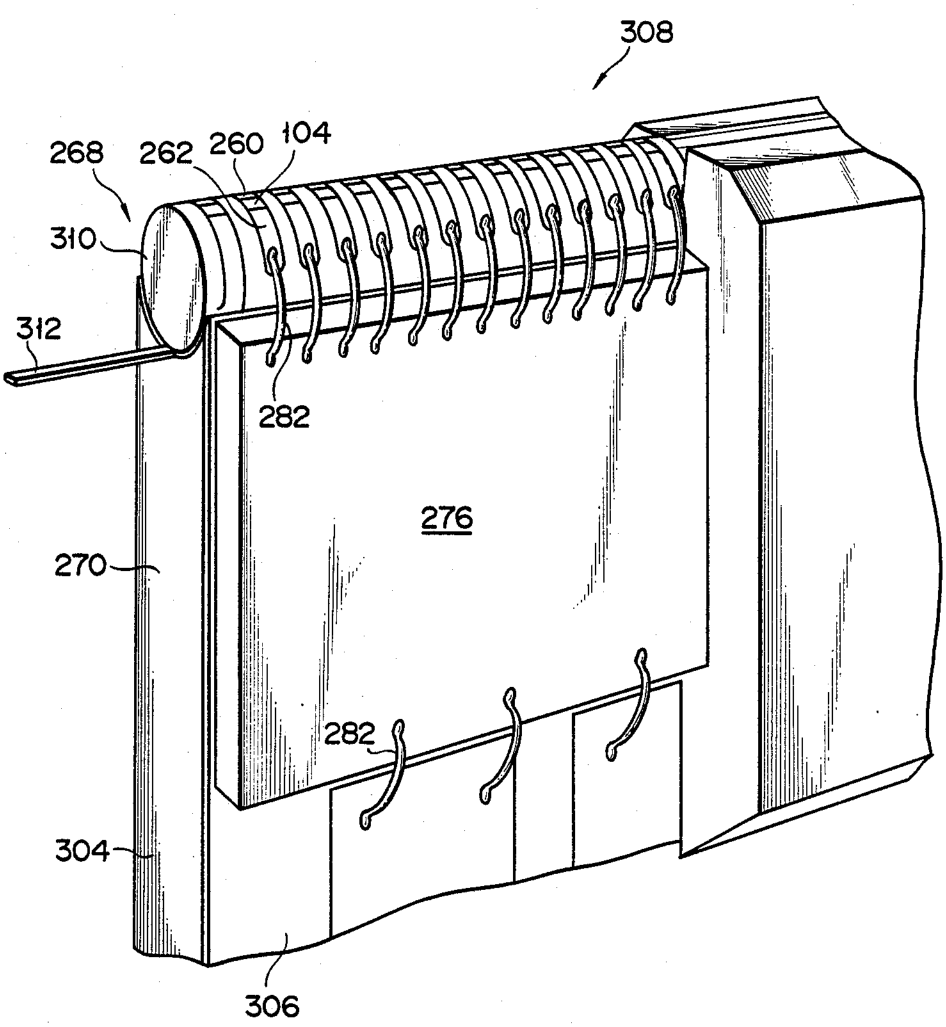
FIG. 22 is a perspective view showing a principal part of the thermal head of FIG. 20.
Figure 23:
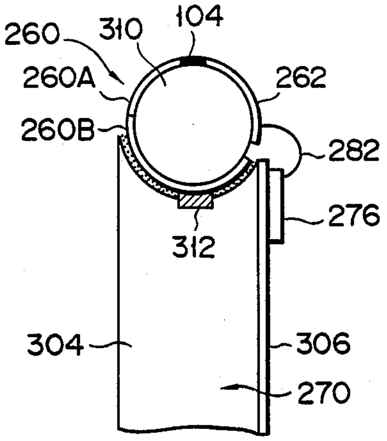
FIG. 23 is a schematic side view of the thermal head shown in FIG. 22.
Figure 24:
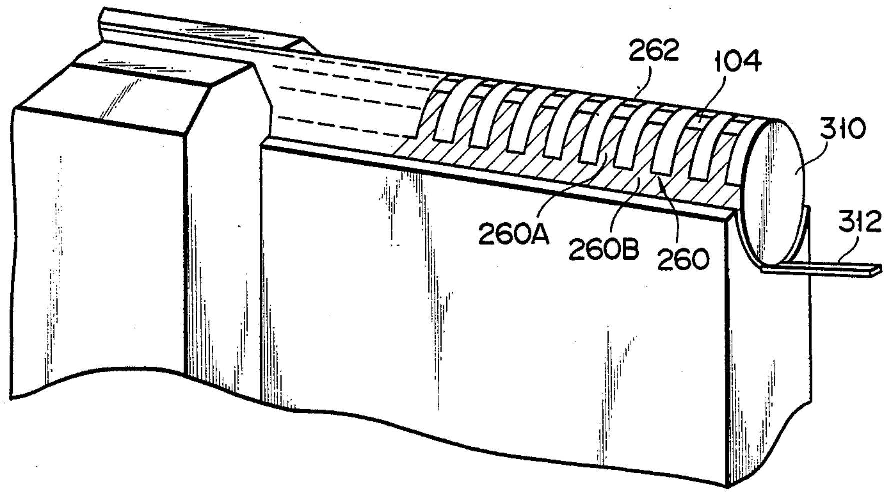
FIG. 24 is a perspective view of the thermal head of FIG. 22 as taken in another direction.

Referring to FIGS. 18 and 19, thermal head 298, according to a second embodiment of the invention, will be described. In this thermal head, a cylindrical metal pipe with hollow 300 therein, for example, molybdenum pipe 302, is used for mounting member 268. Thermistor 284 is located in hollow 300 of member 268, so that heat of the glazed glass layer on the peripheral surface of the molybdenum pipe is detected through a substantially thin molybdenum wall. Thus, thermistor 284 can detect temperature with high accuracy. The temperature of the heating elements can be controlled by regulating the flow of current through the heating elements in accordance with detected temperature change. Support member 270 includes aluminum plate 304 and polyimide plates 306 pasted individually on the opposite sides of plate 304. Driver units 292 are positioned on each polyimide plate. By arranging the driver units on both sides of member 270, each drive control IC for heating elements 104 can be divided in two, thereby permitting halved packaging density of units 292. In this case, two capacitors 294 are provided, corresponding to driver units 292. Heat of molybdenum pipe 302 is transmitted and radiated through aluminum plate 304. The second embodiment provides the same effects as the first embodiment.

Referring now to FIGS. 20 to 24, a third embodiment of the present invention will be described. In thermal head 308, according to this embodiment, round glass rod 310 is used for mounting member 268. Heating elements 104 and electrical conductors 260 and 262 are arranged on the peripheral surface of rod 310. Conductor 260 includes narrow independent patterns 260A arranged corresponding to and in contact with the individual heating elements, and common pattern 260B connected to the independent patterns. Pattern 260B extends along the peripheral surface of rod 310 to the side of conductor 262 or driver unit 276, and is in contact with the end face of support member 270. Thus, heat produced in the heating elements is transmitted to conductor 260, i.e., patterns 260A and 260B, as well as to glass rod 310.

The heat transmitted through glass rod 310 and patterns 260A and 260B is quickly delivered to and diffused in aluminum plate 304, as with support member 270, past that surface portion of rod 310 in contact with plate 304. Thus; the temperature of mounting member 268 cannot increase very much and is less uneven, so that unevenness of print can be greatly reduced.

Power supply bar 312 is located between glass rod 310 and support member 270. It is in contact with common pattern 260B on rod 310. Electric power is supplied from bar 312 to the heating elements through patterns 260A and 260B. According to this third embodiment, therefore; a voltage drop during operations can be minimized.

In this embodiment, moreover, a round insulating glass rod is used for mounting member 268, so that heating elements 104 and electrical conductors 260 and 262 can be arranged directly on the glass rod, without coating the mounting member with an insulating film.

According to the third embodiment, furthermore, mounting member 268 is in the form of a rod, which is easy to manufacture and relatively low in material cost. The manufacturing cost is further reduced since the rod-shaped member requires no polishing work to achieve a level surface. Glass rod 310, having heating elements 104 thereon, and aluminum plate 304, as a heat conductor, are very closely in contact with each other. Also, heat produced in elements 104, on rod 310, is transmitted, with a suitable thermal resistance, to plate 304 via the lead-out electrode patterns of the heating elements. Thus, accumulation of heat is prevented, so that high-quality print without unevenness can be effected.

According to the third embodiment, support member 270 includes an aluminum plate with good thermal conductivity and a glass-epoxy plate with lower thermal conductivity pasted thereon, and the driver unit is located on the glass-epoxy plate. Thus, heat of mounting member 268 can be radiated through the support member without producing any thermal effect on the driver unit.

Since conductor 260 includes narrow independent patterns 260A and wide common pattern 260B, the resistance between heating elements 104 and aluminum plate 304 can be varied by changing the length and thickness of patterns 260A. In other words, desired thermal resistance can be obtained by suitably selecting the thickness, length, and width of patterns 260A.

Figure 25:
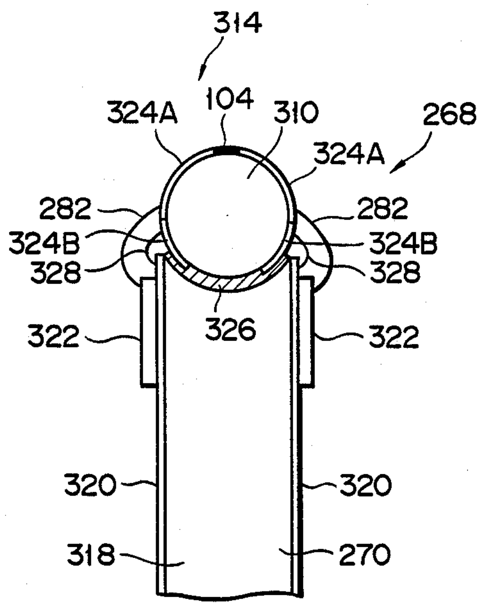
FIG. 25 is a side view showing a principal part of a thermal head according to a fourth embodiment of the invention.

Referring now to FIG. 25, thermal head 314, according to a fourth embodiment of the present invention, will be described in detail. This thermal head differs from thermal head 308 of the third embodiment in that two driver units 322 are provided for driving heating elements 104.

In thermal head 314 of the fourth embodiment, support member 270, for supporting mounting member 268, includes aluminum plate 318 and glass-epoxy plates 320 pasted individually on the opposite sides of plate 318. Driver unit 322 is located on each glass-epoxy plate 320, adjoining the mounting member.

Mounting member 268 is formed with independent patterns 324A and common patterns 324B, alternately extending from heating elements 104 toward their corresponding driver units 322. Patterns 324B extend to the distal end portion of support member 270, and are bonded to the distal end portion of aluminum plate 318, by means of bonding agent 326 (with good thermal conductivity), under mounting member 268. In FIG. 25, number 328 designates wires for connecting common patterns 324B and patterns (not shown) which are formed on glass-epoxy plate 320.

According to the fourth embodiment, the two driver units for driving heating elements 104 are mounted individually on the opposite sides of support member 270, so that the packaging density of ICs in each driver unit is half that in the case of the third embodiment. Thus, the driver unit is greatly reduced in cost, and the thermal head can easily be converted into a higher density version.

To cope with the tendency toward higher-speed operation, driver units 322 of thermal head 314 are necessarily expected to supply a larger current to heating elements 104, naturally resulting in an increased IC chip size. Thus, the system of this embodiment can provide a high-speed, high-resolution thermal head, permitting use of ICs of a relatively large chip area per dot.

It is to be understood that the present invention is not limited to the embodiments described above, and that various changes and modifications may be effected therein by one skilled in the art, without departing from the scope or spirit of the invention.

In the above embodiments, for example, the thermal heads have been described as being used in printers of an ink-jet type. However, the thermal heads of the present invention may also be applied, with the same result, to printers of any other suitable types in which ink from an ink ribbon is transferred to a sheet by fusion, or where thermosensitive paper is used as the recording sheet.

What is claimed is:

1. A thermal head which is used in a printer and produces heat in response to an image forming signal, comprising:

a heating element adapted to produce heat when supplied with electric power;

a mounting member carrying thereon the heating element and a lead-out electrode for supplying electric power to the heating element, said mounting member being formed from a metal material into a rod-shaped structure, so that the heating element and the lead-out electrode are mounted on the peripheral surface of the rod-shaped structure, with an insulating material interposed.

2. The thermal head according to claim 1, wherein said metal material of the mounting member has a thermal conductivity of 0.01 cal/(cm·s·°C.) or more, and a linear thermal expansion coefficient of $1\times10^{-6}$ to $10\times10^{-6}$/°C.

3. The thermal head according to claim 1, wherein said mounting member is in the form of a round rod with a circular cross section.

4. The thermal head according to claim 1, wherein said metal material of the mounting member is molybdenum or an alloy containing molybdenum.

5. The thermal head according to claim 1, wherein said metal material of the rod-shaped member is formed of at least one substance selected from a group of substances including copper, copper-based alloy, stainless steel, nickel, and nickel-based alloy.

6. A thermal head which is used in a printer and produces heat in response to an image forming signal, comprising:

a heating element adapted to produce heat when supplied with electric power;

a mounting member carrying thereon the heating element and a lead-out electrode for supplying electric power to the heating element, said mounting member being formed from a metal material into a rod-shaped structure, so that the heating element and the lead-out electrode are mounted on the peripheral surface of the rod-shaped structure, with an insulating material interposed;

a support member for supporting the mounting member; and a drive unit connected to the lead-out electrode to drive the heating element.

7. The thermal head according to claim 6, wherein an end portion of said support member is recessed, and said mounting member is placed in the recessed portion, so that the peripheral surface of the mounting member is in contact with the recessed portion.

8. The thermal head according to claim 6, wherein said end portion of the support member is shaped along the peripheral surface of the mounting member, so that the support member is in plane contact with part of the peripheral surface of the mounting member.

9. The thermal head according to claim 6, wherein said mounting member is fixed to the support member by means of a thermally conductive bonding agent.

10. The thermal head according to claim 6, wherein said support member includes a first plate with high thermal conductivity and a second plate lower in thermal conductivity than the first plate, said second plate carrying the drive means thereon.

11. The thermal head according to claim 10, wherein said first and second plates are formed of metal and synthetic resin, respectively.

12. The thermal head according to claim 11, wherein said first and second plates are formed of aluminum and epoxy resin, respectively.

13. The thermal head according to claim 10, wherein said drive means is located close to the mounting member and connected to the lead-out electrode by means of a conducting wire.

14. The thermal head according to claim 13, wherein said drive means includes two drive units arranged individually on the opposite side faces of the support member.

15. A thermal head which is used in a printer and produces heat in response to an image-forming signal, comprising:

a heating element adapted to produce heat when supplied with electric power;

a mounting member carrying thereon the heating element and a lead-out electrode for supplying electric power to the heating element, said mounting member being formed in the shape of a rod, so that the heating element and the lead-out electrode are mounted on the peripheral surface of the rod-shaped mounting member;

a support member for supporting the mounting member and for transmitting and diffusing heat from the mounting member; and drive means attached to the support member and connected to the lead-out electrode to drive the heating element, said drive means being fixed to the support substrate by means of a member having lower thermal conductivity than the support member.

16. The thermal head according to claim 15, wherein said support member is formed of metal as the thermal conductor, and said substrate is formed of synthetic resin.

17. The thermal head according to claim 16, wherein said support plate and said substrate are formed of aluminum and glass-epoxy resin material, respectively.

18. The thermal head according to claim 15, wherein a lead-out electrode on said mounting member is in contact with the support member.

19. The thermal head according to claim 18, wherein said lead-out electrode includes independent patterns connected individually to the heating elements, and a common pattern connecting the independent patterns, said common pattern being in contact with the support member.

20. The thermal head according to claim 19, wherein a power supply bar is attached to an end portion of said support member, so that the common pattern electrode is in contact with the bar.

* * * * *